United States Patent
Lesanko et al.

(10) Patent No.: US 10,250,168 B2
(45) Date of Patent: Apr. 2, 2019

(54) PUMP JACK CONTROLLER AND METHOD FOR USING SAME FOR ELECTRICITY GENERATION

(71) Applicant: Lifting Solutions Inc., Edmonton (CA)

(72) Inventors: Michael Lesanko, Edmonton (CA); Lorne Tilby, Leduc (CA)

(73) Assignee: Lifting Solutions Inc., Edmonton (CA)

( * ) Notice: Subject to any disclaimer, the term of this patent is extended or adjusted under 35 U.S.C. 154(b) by 83 days.

(21) Appl. No.: 14/913,906

(22) PCT Filed: Aug. 26, 2014

(86) PCT No.: PCT/CA2014/000643
§ 371 (c)(1),
(2) Date: Feb. 23, 2016

(87) PCT Pub. No.: WO2015/027313
PCT Pub. Date: Mar. 5, 2015

(65) Prior Publication Data
US 2016/0204719 A1    Jul. 14, 2016

Related U.S. Application Data

(60) Provisional application No. 61/871,136, filed on Aug. 28, 2013.

(51) Int. Cl.
| | |
|---|---|
| H02P 3/18 | (2006.01) |
| E21B 41/00 | (2006.01) |
| F03G 7/08 | (2006.01) |
| H02J 3/38 | (2006.01) |
| E21B 47/00 | (2012.01) |
| H02P 23/00 | (2016.01) |

(52) U.S. Cl.
CPC ............... *H02P 3/18* (2013.01); *E21B 41/00* (2013.01); *E21B 47/0008* (2013.01); *F03G 7/08* (2013.01); *H02J 3/381* (2013.01); *H02P 23/0086* (2013.01)

(58) Field of Classification Search
CPC .... H02J 3/381; H02J 11/00; H02J 3/01; H02J 3/1842; H02P 27/06; H02P 27/04; H02P 23/07; H02P 3/18
See application file for complete search history.

(56) References Cited

U.S. PATENT DOCUMENTS

| | | | | |
|---|---|---|---|---|
| 3,867,846 A | * | 2/1975 | Cambern | F04B 47/02 173/1 |
| 5,409,356 A | | 4/1995 | Massie | |
| 5,425,623 A | * | 6/1995 | London | F04B 47/02 318/606 |
| 6,325,142 B1 | * | 12/2001 | Bosley | E21B 47/0008 166/53 |

(Continued)

OTHER PUBLICATIONS

International Application No. PCT/CA2014/000643 Search Report and Written Opinion dated Nov. 24, 2014.

*Primary Examiner* — Bentsu Ro
*Assistant Examiner* — Thai Dinh
(74) *Attorney, Agent, or Firm* — Dentons US LLP

(57) ABSTRACT

A pump jack controller is provided that can harness the waste energy generated during the operation of a pump jack when its electrical motor is in an over-speed condition, and convert that waste energy into electrical energy that can be supplied back onto an electrical power grid thus converting the pump jack into a micro electric power generator.

27 Claims, 8 Drawing Sheets

(56) References Cited

U.S. PATENT DOCUMENTS

| | | | | |
|---|---|---|---|---|
| 7,332,885 B2* | 2/2008 | Schnetzka | ............... | H02J 9/062 318/400.01 |
| 8,803,363 B2* | 8/2014 | Veltri | ............... | H02J 3/30 307/47 |
| 9,030,851 B2* | 5/2015 | Nagel | ............... | H02M 3/155 363/131 |
| 9,033,676 B2* | 5/2015 | Palka | ............... | E21B 43/127 417/44.1 |
| 9,938,804 B2* | 4/2018 | Haarstad | ............... | E21B 43/127 |
| 2001/0052704 A1 | 12/2001 | Bosley et al. | | |
| 2009/0001911 A1* | 1/2009 | Kayikci | ............... | H02P 9/02 318/254.1 |
| 2011/0080130 A1* | 4/2011 | Venkataraman | ............... | H02P 6/182 318/474 |
| 2012/0217920 A1* | 8/2012 | Singh | ............... | G01R 31/343 318/490 |
| 2013/0099565 A1* | 4/2013 | Sachs | ............... | H02J 3/46 307/25 |
| 2014/0042948 A1* | 2/2014 | Green | ............... | H02P 27/04 318/503 |

* cited by examiner

PUMP JACK CONTROLLER AND METHOD FOR USING SAME FOR ELECTRICITY GENERATION

CROSS-REFERENCE TO RELATED APPLICATIONS

This application claims priority of U.S. provisional patent application Ser. No. 61/871,136 filed Aug. 28, 2013, which is incorporated by reference into this application in its entirety.

TECHNICAL FIELD

The present disclosure is related to the field of electric controllers for operating pump jacks, in particular, pump jack controllers that can capture electricity generated by the pump jack to put back onto an electric grid.

BACKGROUND

A pump jack is the above ground drive for a reciprocating piston pump in a well. It is used to mechanically lift liquid, such as oil, out of the well if there is not enough bottom hole or formation pressure for forcing the liquid to flow up to the surface. Pump jacks are commonly used for onshore wells. A pump jack converts the rotary mechanism of a drive motor to a vertical reciprocating motion to drive the pump shaft, and displays a characteristic nodding motion.

Modern pump jacks are powered by a prime mover, which commonly comprises an electric motor. The prime mover runs a set of pulleys that, in turn, drive a pair of cranks, generally fitted with counterweights to assist the motor in lifting the heavy string of the rod line running into the ground. The cranks raise and lower one end of a beam, which is free to move on an A-shaped frame. On the other end of the beam is a "donkey head", so named due to its appearance. The donkey head moves up and down as the cranks rotate.

An induction or asynchronous motor is an alternating current ("AC") motor in which all electromagnetic energy is transferred by inductive coupling from a primary winding to a secondary winding, the two windings separated by an air gap. In both induction and synchronous motors, the AC power supplied to a stator disposed in the motor creates a magnetic field that rotates in time with the frequency of the AC power. A synchronous motor's rotor turns at the same rate as the stator field. In contrast, an induction motor's rotor rotates at a slower speed than the stator field. The induction motor stator's magnetic field is, therefore, changing or rotating relative to the rotor. This induces an opposing current in the induction motor's rotor, in effect, the motor's secondary winding when the latter is short-circuited or closed through an external impedance. The rotating magnetic flux induces currents in the rotor windings in a manner similar to currents induced in a transformer's secondary windings. These currents, in turn, create magnetic fields in the rotor that react against the stator field. Due to Lenz's Law, the direction of the magnetic field created will be such as to oppose the change in current through the windings. The cause of the induced current in the rotor windings is the rotating stator magnetic field, so to oppose this effect the rotor will start to rotate in the direction of the rotating stator magnetic field. The rotor accelerates until the magnitude of the induced rotor winding current and torque balances the applied load. Since rotation at synchronous speed would result in no induced rotor current, an induction motor always operates slower than synchronous speed.

For the motor to run, the speed of the physical rotor must be lower than that of the stator's rotating magnetic field ($\eta_s$), or the magnetic field would not be moving relative to the rotor conductors and no currents would be induced. As the speed of the rotor drops below synchronous speed, the rotation rate of the magnetic field in the rotor increases, inducing more current in the windings and creating more torque. The ratio between the rotation rate of the magnetic field, as seen by the rotor (slip speed), and the rotation rate of the stator's rotating field is called "slip". Under load, the speed drops and the slip increases enough to create sufficient torque to turn the load. For this reason, induction motors are sometimes referred to as asynchronous motors. An induction motor can be used as an induction generator by running the motor at a speed higher than the synchronous speed of the stator magnetic field. In other words, by running the motor a negative slip.

Slip, s, is defined as the difference between synchronous speed and operating speed, at the same frequency, expressed in revolutions per minute ("RPM"), or in percent or ration of synchronous speed. Thus:

$$s = \frac{\eta_s - \eta_r}{\eta_s}$$

where $\eta_s$ is the synchronous speed of the stator magnetic field; and $\eta_r$ is the rotor mechanical speed.

Therefore, as the motor operates to lift the donkey head, the motor consumes electrical power from an electrical power grid. In doing so, potential energy is created in lifting the donkey head. As the donkey head falls, the potential energy can be converted to kinetic energy as the motor can operate as a generator to generate electricity to put back onto the electrical power grid.

Underwriters Laboratories standard no. UL1741 is an accepted standard for grid interconnection with an electrical utility for inverter-based micro-generation technology, such as used in wind-generated electricity technology.

It is also known to use induction motors in some applications, such as operating a crane or elevator lifts, as a generator to put electricity back onto an electrical grid, but there are no applications using pump jack motors to do the same.

It is, therefore, desirable to provide a pump jack controller to harness the potential energy generated in operating a pump jack and convert that potential energy into electricity that can be put back onto an electrical grid in compliance with standards for micro-generation equipment.

SUMMARY

In some embodiments, a pump jack controller is provided that can harness the potential energy created in operating a pump jack into AC electric power that can be put back onto an AC electric grid such that the pump jack can operate as a micro electric generator.

Broadly stated, in some embodiments, a pump jack controller is provided for converting waste energy created during the operation of a pump jack into electrical energy that can be supplied back to an electric power grid, the pump jack operatively coupled to and operated by an electric induction motor, the pump jack controller comprising: a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor into generated DC power that is outputted from the DC input; a DC bus operatively coupled to the DC input of the MDU; and a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU further configured to invert DC power supplied to the DC output into generated AC power that is outputted from the AC input back to the power grid.

Broadly stated, in some embodiments, a method is provided for converting waste energy, created during the operation of a pump jack, into electrical energy that can be supplied back to an electric power grid, the pump jack operatively coupled to and operated by an electric induction motor, the method comprising the steps of: providing a pump jack controller and operatively coupling it to the pump jack, the pump jack controller further comprising: a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor into generated DC power that is outputted from the DC input, a DC bus operatively coupled to the DC input of the MDU, and a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU further configured to invert DC power supplied to the DC output into generated AC power that is outputted from the AC input back to the power grid; supplying the source of supplied AC power to the controller to power the motor to operate the pump jack; producing generated DC power with the motor when the motor is in an over-speed condition, wherein the generated DC power is outputted from the DC input onto the DC bus; and operating the GDU to invert the generated DC power into generated AC power that is outputted from the AC input of the GDU to the power grid when the generated DC power comprises a DC voltage that rises above a predetermined threshold.

Broadly stated, in some embodiments, a hybrid pump jack controller is provided for converting waste energy, created during the operation of a pump jack, into electrical energy that can be supplied back to an electric power grid, the pump jack operatively coupled to and operated by an electric induction motor further comprising a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor into generated DC power that is outputted from the DC input, the hybrid pump jack controller comprising: a DC bus operatively coupled to the DC input of the MDU; and a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU further configured to invert DC power supplied to the DC output into generated AC power that is outputted from the AC input back to the power grid.

Broadly stated, in some embodiments, the controller can further comprise a low-pass filter unit disposed between the AC input of the GDU and the source of supplied AC electric power.

Broadly stated, in some embodiments, the MDU can further comprise a first inverter-based motor drive unit.

Broadly stated, in some embodiments, the DC bus can comprise a filter capacitor.

Broadly stated, in some embodiments, the GDU can comprise a second inverter-based motor drive unit.

Broadly stated, in some embodiments, the source of supplied AC power can be connected to the electric power grid.

Broadly stated, in some embodiments, the source of supplied AC power can comprise 3-phase AC electric power.

DETAILED DESCRIPTION OF EMBODIMENTS

In some embodiments, a pump jack controller is provided that can harness the potential energy created in operating a pump jack into AC electric power that can be put back onto an AC electric grid such that the pump jack can operate as a micro electric generator.

Figure 1:
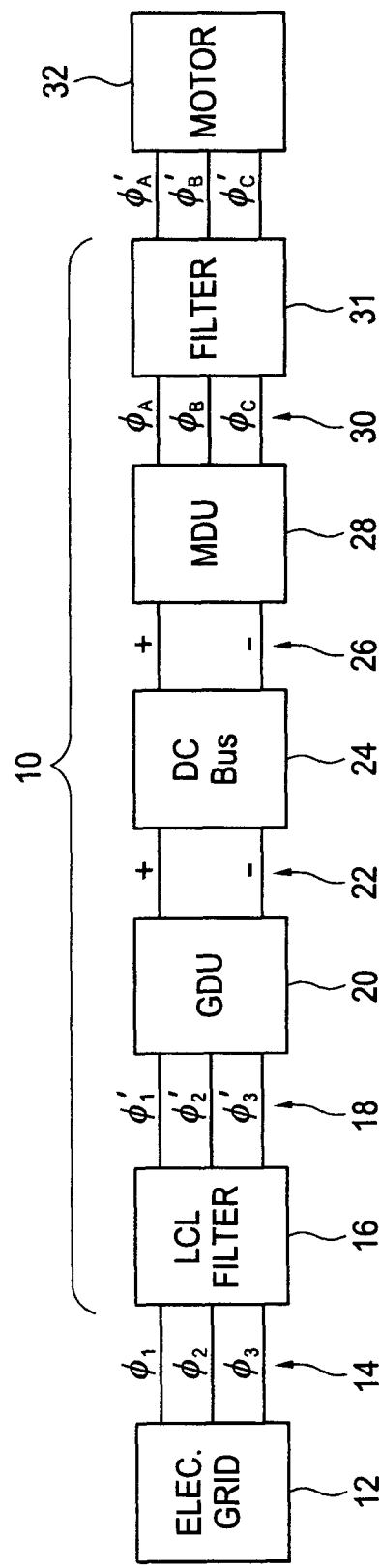
FIG. 1 is a block diagram depicting one embodiment of a controller for use with a pump jack.

Referring to FIG. 1, a block diagram of one embodiment of pump controller 10 is shown. In some embodiments, controller 10 can be connected to alternating current ("AC") electric power grid 12 via electric connections 14. In this illustration, connections 14 represent a 3-phase AC electric power connection, as well known to those skilled in the art although it is equally obvious to those skilled in the art that a single phase power connection or a poly-phase power connection can be substituted.

Figure 4:
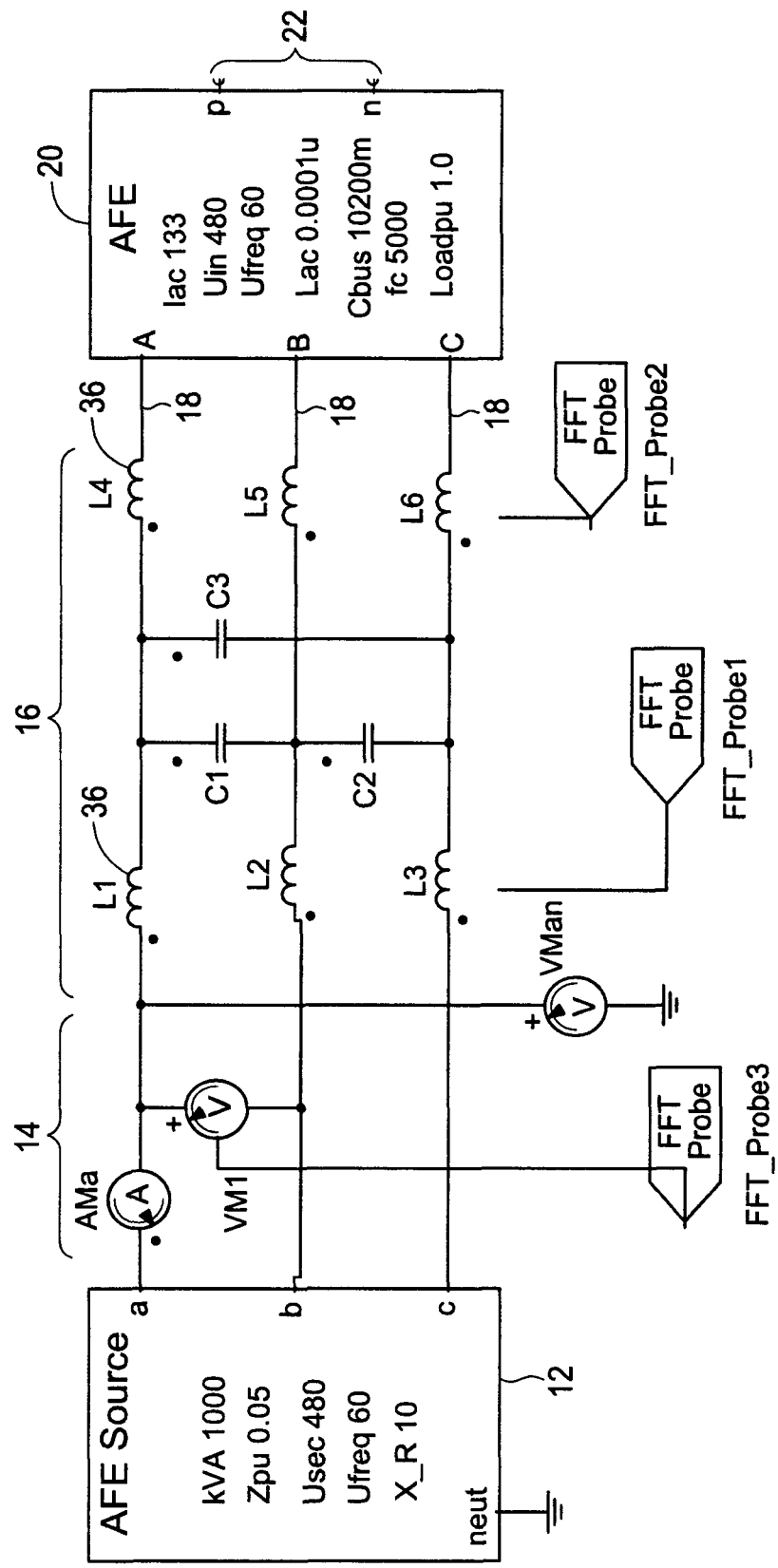
FIG. 4 is an electrical circuit schematic depicting a general circuit model of the controller of FIG. 1 including an Active Front End.

In some embodiments, controller 10 can comprise low pass filter unit 16 further comprising a first port and a second port. The first port can be operatively coupled to electric connections 14. In some embodiments, filter unit 16 can comprise a third-order low-pass filter further comprising an inductor-capacitor-inductor configuration as well known to those skilled in the art. Filter unit 16 is shown in more detail in FIG. 4. In a representative embodiment, inductors 36 can comprise an inductance value in the range of 0.11 to 5.2 mH, and capacitors 38 can comprise a capacitance value in the range of 1.5 to 192 µF. The values of inductors 36 and capacitors 38 can also be selected by those skilled in the art, depending on the size of motor 32 to be controlled by controller 10. In some embodiments, controller 10 can be configured to operate electric motors producing power in the range of 5 to 300 horsepower. Filter unit 16 is has specific heat dissipation characteristics, in the range of 70 to 1650 watts so as to maintain temperature stability within 4° C. of ambient temperature.

Figure 2:
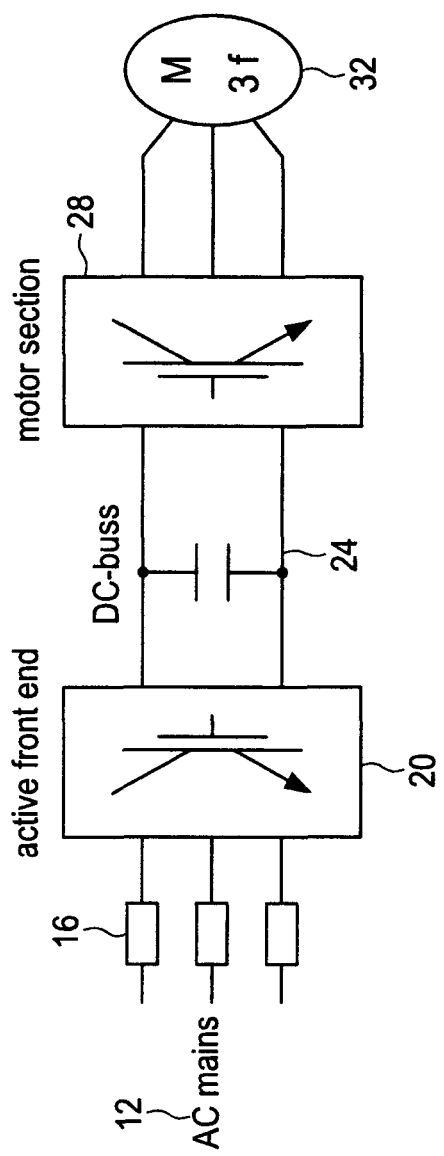
FIG. 2 is a simplified block diagram depicting the controller of FIG. 1.

Referring to FIGS. 1 and 2, the second port of filter unit 16 can be connected to generator drive unit ("GDU") 20 via electrical connections 18. In some embodiments, GDU 20 can comprise an inverter-based motor drive unit that can be used to rectify a source of supplied AC electric power, such as from electric grid 12, into DC power. For the purposes of this specification, GDU 20 is also referred to as an "Active Front End" or "AFE".

Figure 5:
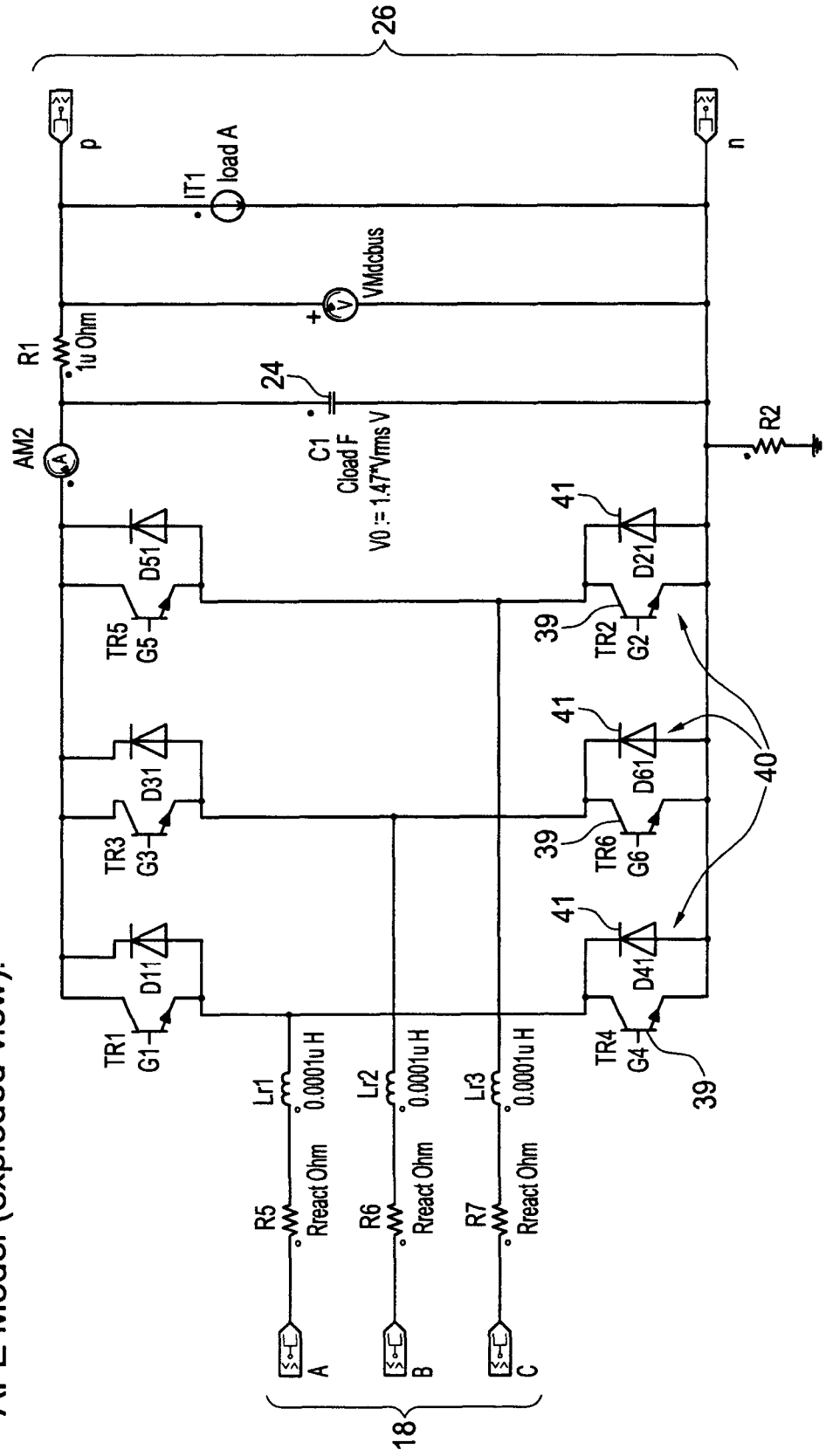
FIG. 5 is an electrical circuit schematic depicting the Active Front End of FIG. 4.

As shown in FIG. 5, GDU 20 can comprise a number of switching devices 40 configured to invert DC power into AC power, as known to those skilled in the art. Each device 40 can comprise a solid state device 39 bypassed by a diode 41. Solid state devices 39 can comprise any suitable device for providing an electrical switching function such as transistors, field effect transistors ("FETs"), MOSFETs, insulated gate bipolar transistors ("IGBTs"), silicon controlled rectifiers ("SCRs"), triacs or any other equivalent functioning solid state device as known to those skilled in the art. By operating GDU 20 "in reverse", that is, supplying the source of supplied AC power to AC output connections of a motor drive unit, diodes 41 can rectify the supplied AC power into DC power that can be outputted from the DC input of the motor drive unit. In a representative embodiment, GDU can include a motor drive unit as manufactured by Elettronica Santerno S.PA of Imola, ITALY, model no. SINUS PENTA 0005 thru 0524.

Referring back to FIG. 1, GDU 20 can be coupled to DC bus 24 via DC power connections 22. In some embodiments, DC bus 24 can comprise a filter capacitor as shown in FIG. 5. In some embodiments, the filter capacitor can comprise a capacitance value in the range of 3,300 to 40,000 µF. The capacitance value of the capacitor disposed in DC bus 24 can depend on the size of motor 32 being controlled by controller 10. In some embodiments, the capacitance value can increase as the size of motor 32 increases.

In some embodiments, DC bus 24 can be connected to motor drive unit ("MDU") 28 via DC power connections 26. Similar to GDU 20, MDU 28 can comprise an inverter-based motor drive unit. In some embodiments, MDU 28 can comprise the same motor drive unit as disposed in GDU 20. MDU 28 is configured to be fed or powered by the DC bus 24 of GDU 20. GDU 20 is setup with a PID control to regulate and maintain a preset DC bus value. This DC bus value is considered a setpoint DC value calculated as a value in excess of the total of the main voltage of GDU 20 multiplied by the square root of two.

In some embodiments, MDU 28 can be connected to motor 32 via AC power connections 30. In some embodiments, motor 32 can comprise an induction or asynchronous electric motor. In some embodiments, controller 10 can further comprise reactor filter 31 disposed between MDU 28 and motor 32 to provide low-pass filtering of the AC power supplied to motor 32, as well known to those skilled in the art.

Figure 3:
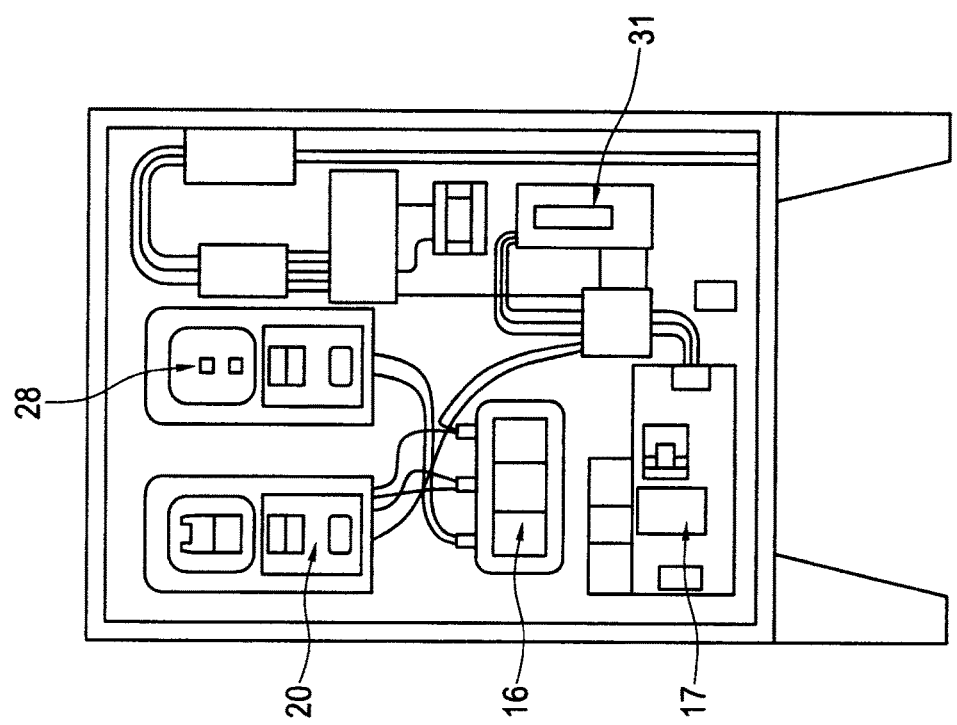
FIG. 3 is a front elevation view depicting the controller of FIG. 1 installed in a cabinet.

Referring to FIG. 3, one embodiment of controller 10 is shown installed in cabinet 34, including GDU 20, MDU 28, filter unit 16 (including generative interface 17) and filter reactor 31.

Figure 6A:
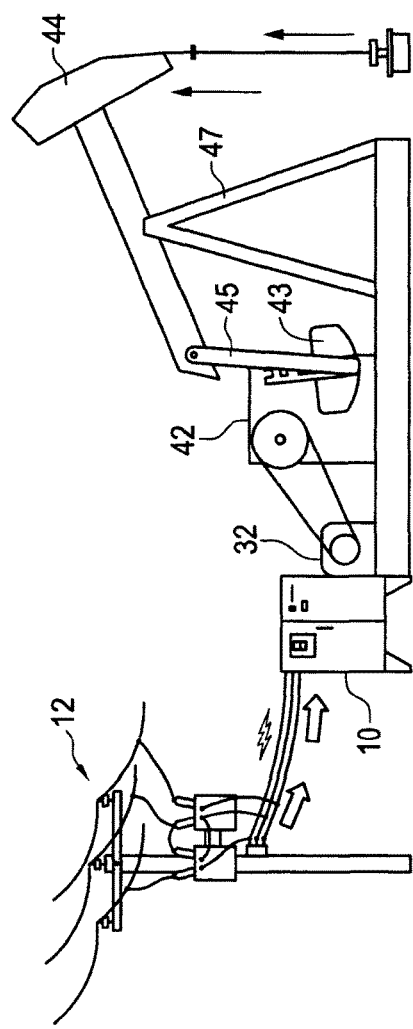
FIGS. 6a and 6b are block diagrams depicting a pump jack in operation with the controller of FIG. 1.
Figure 6B:
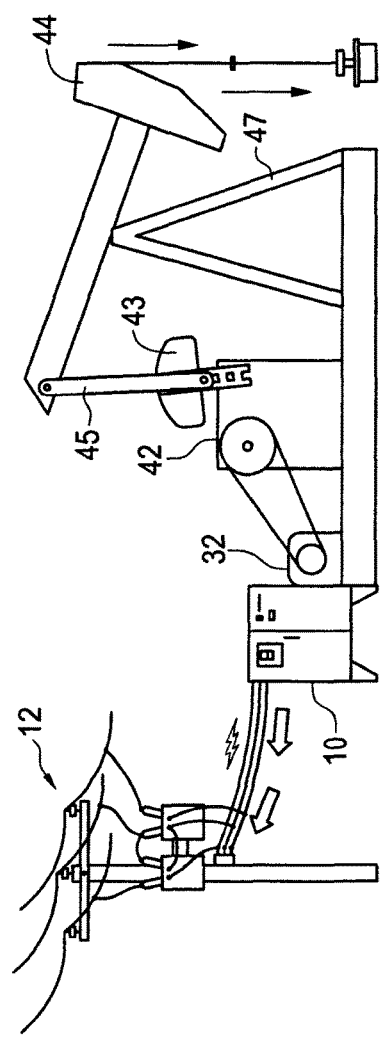

Referring to FIGS. 6a and 6b, pump jack 42 is shown being operated by motor 32, which is controlled by controller 10 supplied by power from electric grid 12. As well known to those skilled in the art, pump jack 42 comprises donkey head 44 pivotally attached to support frame 47, wherein donkey head 44 is operatively coupled to counterweight 43 via connecting rod 45. In FIG. 6a, motor 32 is operating to rotate counterweight 43 downward which, in turn, raises donkey head 44 upward as it pivots on supporting frame 47. In FIG. 6b, motor 32 operates to rotate counterweight 43 upwards which, in turn, lowers donkey head 44 downwards. Depending on the conditions of the well and the type of oil (light or heavy) being extracted, motor 32 can be placed in an "over-speed" or "negative torque" operating condition when donkey head 44 is falling or when counterweight 43 is falling. In other words, either of donkey head 44 or counterweight 43 falling can cause an over-speed condition in motor 32 depending on whether pump jack 42 is pump heavy or counterweight heavy, respectively. In either case, the energy expended or released by donkey head 44 or counterweight 43 falling is energy that is otherwise wasted. It is when motor 32 is operating in an over-speed condition caused by the release of this waste energy that motor 32 can operate as a generator. As motor 32 operates as an AC power generator, MDU 28 can rectify the AC power generated by motor 32 into generated DC power that can be outputted onto DC bus 24. When the DC voltage of the generated DC power rises above a predetermined set point or threshold, GDU 20 can operate to invert the generated DC power into generated AC power that can be outputted through filter unit 16 onto electric grid 12, thus allowing pump jack 42 to operate as a micro electric generator.

Figure 7:
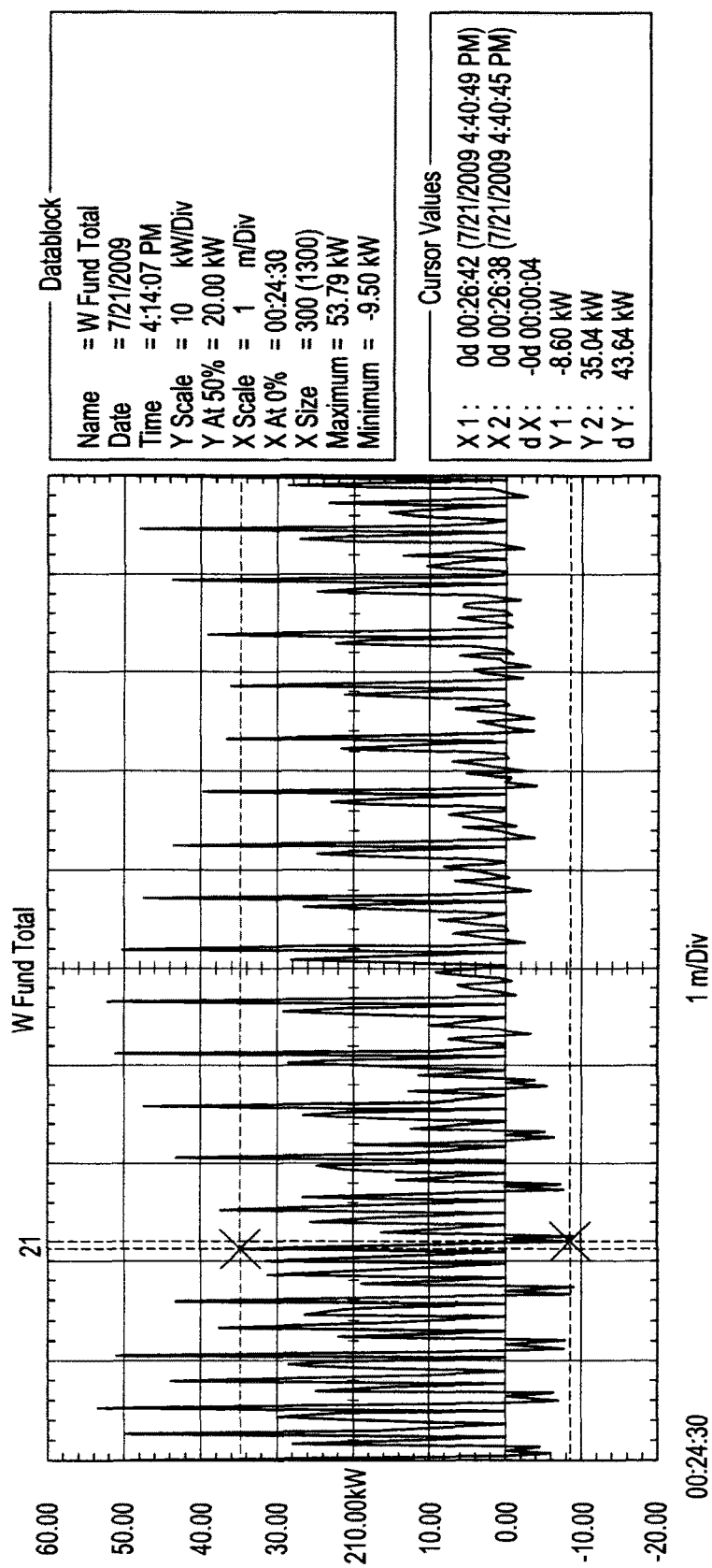
FIG. 7 is an X-Y graph depicting the power consumption of a pump jack using the controller of FIG. 1.

Referring to FIG. 7, an X-Y graph is shown illustrating the power consumption of a pump jack being operated with controller 10. As shown in the graph, the spikes that extend below the zero power line represent power being generated by the pump jack that can be put back onto an electric power grid.

Figure 8:
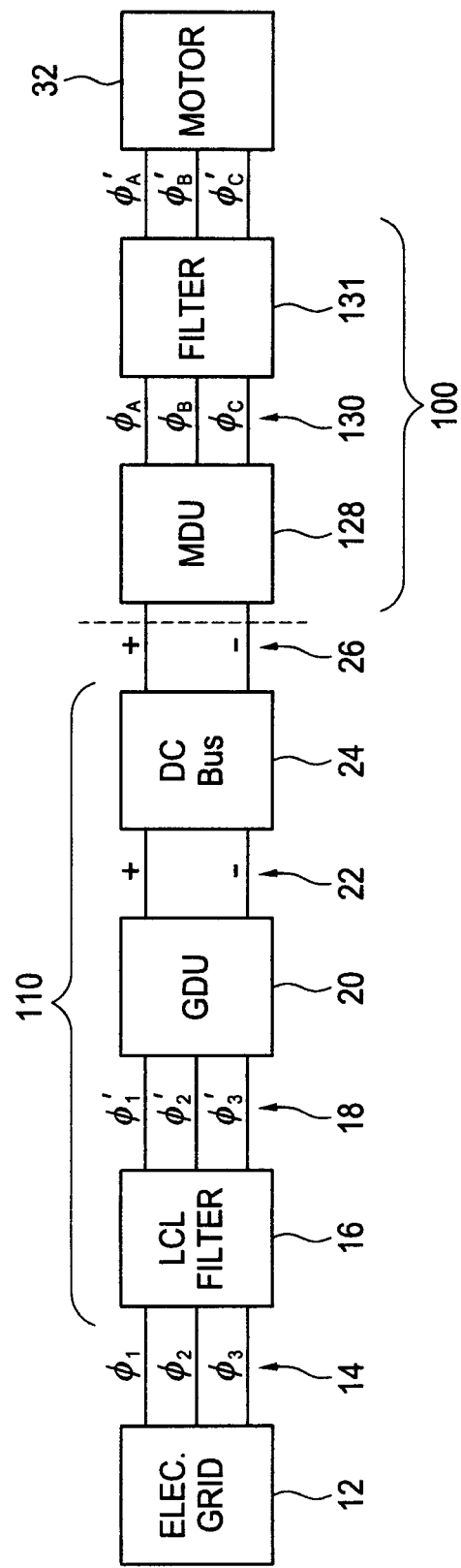
FIG. 8 is block diagram depicting one embodiment of a hybrid controller for use with a pump jack.

In some embodiments, the controller can be configured as a "hybrid" system, one embodiment of which is illustrated in FIG. 8. In some embodiments, the controller can comprise hybrid controller 110, which can further comprise controller 10 without MDU 28 and reactor filter 31. In this configuration, controller 110 can be configured or adapted to work with an end user's motor controller system 100, which can comprise MDU 128 supplying AC power to filter reactor 131 over power connections 130, as opposed to using MDU 28 and filter reactor 31, as shown in FIG. 1. Similar to GDU 20 or MDU 28, can comprise an inverter-based motor drive unit. In this configuration, the benefits of controller 10 can be experienced by end users who already have a motor drive unit, and related hardware and electronic componentry, to operate motor 32. In some embodiments, MDU 128 may comprise phase loss circuitry to detect the loss of commercial AC power supplying a rectifier that would normally be used with MDU 128 when not being controlled by controller 110. In such circumstances, MDU 128 can be configured to disable this phase loss detect feature by disabling the operation of phase loss in the operating software used in the operation of MDU 128, or by disabling the feature through configuring the hardware of MDU 128 such that no phase loss is present; GDU 20 can detect whether there is any loss in the commercial AC being supplied by electrical grid 12. This functionality of GDU 20 is present whether GDU 20 is present in controller 10 or controller 110.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A pump jack controller for converting waste energy created during the operation of a pump jack into electrical energy that is then supplied back to an electric power grid, the pump jack operatively coupled to and operated by an electric induction motor, the pump jack comprising a donkeyhead and a counterweight operatively coupled thereto wherein each of the donkeyhead and the counterweight rise and fall when the pump jack is operated by the electric induction motor, the pump jack controller comprising:
    a) a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor into generated DC power that is outputted from the DC input when either of the donkeyhead and the counterweight is falling thereby causing the motor to be in a negative torque operating condition;
    b) a DC bus operatively coupled to the DC input of the MDU; and
    c) a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU configured to regulate and maintain a preset DC bus value on the DC bus, the GDU further configured to invert the generated DC power into generated AC power that is outputted from the AC input back to the power grid when the generated DC power supplied to the DC bus by the MDU exceeds the preset DC bus value.

2. The controller as set forth in claim 1, further comprising a low-pass filter unit disposed between the AC input of the GDU and the source of supplied AC electric power.

3. The controller as set forth in claim 1, wherein the MDU further comprises a first inverter-based motor drive unit.

4. The controller as set forth in claim 1, wherein the DC bus comprises a filter capacitor.

5. The controller as set forth in claim 1, wherein the GDU comprises a second inverter-based motor drive unit.

6. The controller as set forth in claim 1, wherein the source of supplied AC power is connected to the electric power grid.

7. The controller as set forth in claim 6, wherein the source of supplied AC power comprises 3-phase AC electric power.

8. The controller as set forth in claim 1, wherein the preset DC value is in excess of the supplied AC electric power multiplied by the square root of 2.

9. The controller as set forth in claim 1, wherein the GDU further comprises a PID control for regulating and maintaining the preset DC bus value on the DC bus.

10. A method for converting waste energy, created during the operation of a pump jack, into electrical energy that is then supplied back to an electric power grid, the pump jack operatively coupled to and operated by an electric induction motor, the pump jack comprising a donkeyhead and a counterweight operatively coupled thereto wherein each of the donkeyhead and the counterweight rise and fall when the pump jack is operated by the electric induction motor, the method comprising the steps of:
    a) providing a pump jack controller and operatively coupling it to the pump jack, the pump jack controller further comprising:
        i) a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor into generated DC power that is outputted from the DC input when either of the donkeyhead and the counterweight is falling thereby causing the motor to be in a negative torque operating condition,
        ii) a DC bus operatively coupled to the DC input of the MDU, and
        iii) a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU configured to regulate and maintain a preset DC bus value on the DC bus, the GDU further configured to invert the generated DC power into generated AC power that is outputted from the AC input back to the power grid when the generated DC power supplied to the DC bus by the MDU exceeds the preset DC bus value;
    b) supplying the source of supplied AC power to the controller to power the motor to operate the pump jack;
    c) producing generated DC power with the motor when the motor is in a negative torque condition when either of the donkeyhead and the counterweight is falling, wherein the generated DC power is outputted from the DC input onto the DC bus; and
    d) using the GDU, inverting the generated DC power into generated AC power that is outputted from the AC input of the GDU to the power grid when the generated DC power comprises a DC voltage that exceeds the preset DC bus value.

11. The method as set forth in claim 10, wherein the pump jack controller further comprises a low-pass filter unit disposed between the AC input of the GDU and a source of the AC electric power.

12. The method as set forth in claim 10, wherein the MDU further comprises a first inverter-based motor drive unit.

13. The method as set forth in claim 10, wherein the DC bus comprises a filter capacitor.

14. The method as set forth in claim 10, wherein the GDU comprises a second inverter-based motor drive unit.

15. The method as set forth in claim 10, wherein the source of supplied AC power is connected to the electric power grid.

16. The method as set forth in claim 15, wherein the source of supplied AC power comprises 3-phase AC electric power.

17. The method as set forth in claim 10, wherein the preset DC value is in excess of the supplied AC electric power multiplied by the square root of 2.

18. The method as set forth in claim 10, wherein the GDU further comprises a PID control for regulating and maintaining the preset DC bus value on the DC bus.

19. A hybrid pump jack controller for converting waste energy, created during the operation of a pump jack, into electrical energy that is then supplied back to an electric power grid, the pump jack operatively coupled to and operated by an electric induction motor, the pump jack comprising a donkeyhead and a counterweight operatively coupled thereto wherein each of the donkeyhead and the counterweight rise and fall when the pump jack is operated by the electric induction motor, the pump jack further comprising a motor drive unit ("MDU") comprising a direct current ("DC") input and an alternating current ("AC") output, the AC output operatively coupled to the electric induction motor, the MDU configured to invert DC power supplied to the DC input into AC power that is outputted from the AC output to power the motor, the MDU further configured to rectify AC electric power generated by the motor when the motor is in a negative torque operating condition into generated DC power that is outputted from the DC input, the hybrid pump jack controller comprising:
  a) a DC bus operatively coupled to the DC input of the MDU; and
  b) a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU configured to regulate and maintain a preset DC bus value on the DC bus, the GDU further configured to invert the generated DC power into generated AC power that is outputted from the AC input back to the power grid when either of the donkeyhead and the counterweight are falling and when the generated DC power supplied to the DC bus by the MDU exceeds the preset DC bus value.

20. The controller as set forth in claim 19, further comprising a low-pass filter unit disposed between the AC input of the GDU and the source of supplied AC electric power.

21. The controller as set forth in claim 19, wherein the MDU further comprises a first inverter-based motor drive unit.

22. The controller as set forth in claim 19, wherein the DC bus comprises a filter capacitor.

23. The controller as set forth in claim 19, wherein the GDU comprises a second inverter-based motor drive unit.

24. The controller as set forth in claim 19, wherein the source of supplied AC power is connected to the electric power grid.

25. The controller as set forth in claim 24, wherein the source of supplied AC power comprises 3-phase AC electric power.

26. The controller as set forth in claim 19, wherein the preset DC value is in excess of the supplied AC electric power multiplied by the square root of 2.

27. The controller as set forth in claim 19, wherein the GDU further comprises a PID control for regulating and maintaining the preset DC bus value on the DC bus.

* * * * *